Sept. 6, 1932. R. F. WALTERS Re. 18,589

SNAP FASTENER

Original Filed July 24, 1924

Inventor:
Rollo F. Walters,
by Emery, Booth, Varney & Townsend
Attys.

Reissued Sept. 6, 1932 Re. 18,589

UNITED STATES PATENT OFFICE

ROLLO F. WALTERS, OF DETROIT, MICHIGAN, ASSIGNOR TO UNITED-CARR FASTENER CORPORATION, OF CAMBRIDGE, MASSACHUSETTS, A CORPORATION OF MASSACHUSETTS

SNAP FASTENER

Original application filed July 24, 1924, Serial No. 727,958, and in Canada November 9, 1926. Divided and application filed January 21, 1929. Serial No. 333,908. Patent No. 1,769,727, dated July 1, 1930. Application for reissue filed April 27, 1932. Serial No. 607,877.

This invention aims to provide an improved detachable snap fastener particularly useful in connection with upholstery installations.

This application is a division of my prior application Serial No. 727,958, filed July 24, 1924.

In the drawing, which illustrates a preferred and two modified forms of my invention:

Referring to the preferred form of my invention, as illustrated in Figs. 1 through 5, I have shown (Fig. 1) an automobile door 1 having a frame part 2, to which are secured a plurality of socket-engaging studs. Beneath each stud, I have provided in the frame part 2, an aperture 2*a* which in this instance serves as a guide in positioning the studs on the frame 2, so that they will be in the proper position for engagement with eyelets on the upholstered part.

These apertures 2*a* may also be used for stud-receiving apertures when the upholstered part is provided with stud members. Thus the apertures 2*a* may be used for either of the purposes mentioned above, but I prefer in this invention to use them as markers for positioning the studs on the frame part 2.

Figure 1:
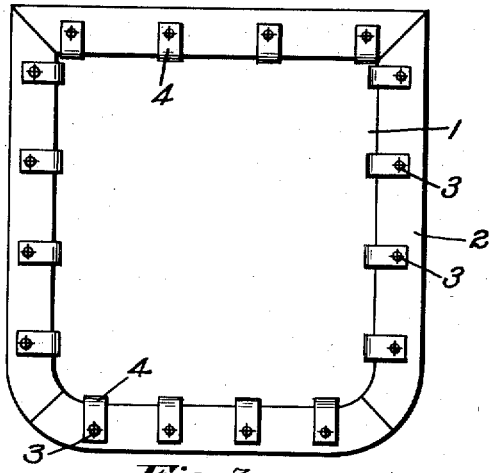
Figure 1 is an elevation view of the inside of an automobile door, showing the shiftable studs positioned upon the frame of the door.
Figure 2:
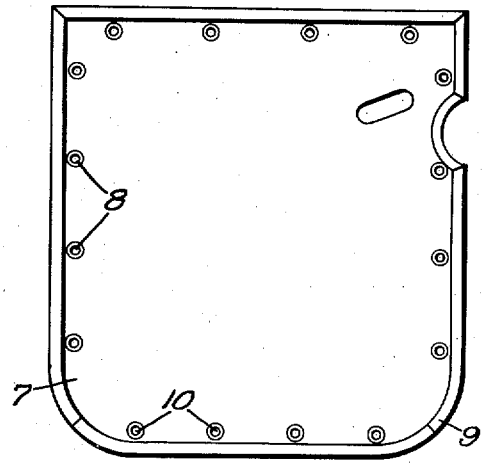
Fig. 2 is an inside elevation of the upholstery installation.
Figure 3:
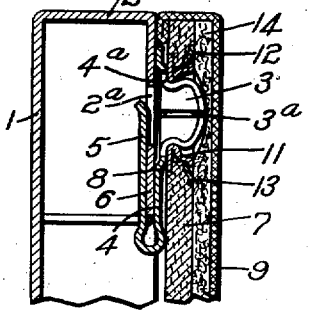
Fig. 3 is a longitudinal section through a portion of the door showing one of the studs with the upholstered installation secured thereto.

Each stud is pressed from a single sheet of metal (Figs. 4 and 5) and presents a contractible and expansible head 3, a base 4 and an underlying spring finger or shank 5 formed from the base 4, thereby to cooperate with the base to provide a clip-like portion. When secured to the frame part 2 of the door, the base of the stud lies against the front web 6 of the frame part 2 and the spring finger 5 slips over the edge of the frame part and bears against the under side of the web 6, thus permitting the stud to be shifted transversely relative to the frame part 2, while the stud may be held in the desired position by the spring finger 5, as best illustrated in Fig. 3.

Figure 5:
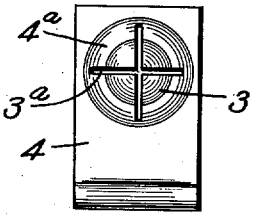
Fig. 5 is a front elevation of a preferred form of removable stud.

The heads of the studs have slots 3*a*, which extend from the head of each stud a substantial distance into the raised portion 4*a* (Fig. 3) of the base 4 of the stud to permit bending of the contractible and expansible parts of the stud upon straight lines, between the slots, which do not intersect the head of the stud, as illustrated in Fig. 5. Thus the raised portion 4*a* of the stud permits the head of the stud to contract and expand without interfering with the web 6 of the frame 2 of the door.

The upholstered part for covering that side of the door at which the studs are secured, comprises a backing 7 of substantially rigid material, such as cardboard or the like, a plurality of sockets or eyelets 8 and a flexible covering 9 of fabric, leather or the like at one side of the backing 7.

Figure 4:
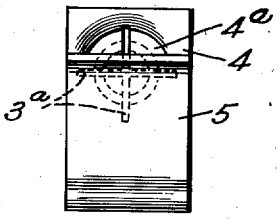
Fig. 4 is a rear elevation of the preferred form of the removable stud.

Each eyelet 8 presents a stud-receiving aperture 10 and a rivet part 11, which extends through an aperture 12 in the backing 7 and is clenched over a clench washer 13 at the opposite side of the backing, as best illustrated in Fig. 4. The rivet part of the eyelet flares outwardly back of the stud-receiving aperture, thereby to provide a recess into which the head of the stud fits when a stud is engaged with the eyelet.

When the eyelets 8 are all secured to the backing 7, a padding 14 is placed over the surface of the backing at that side thereof at which the clench washers are exposed. Then the flexible covering 9 is stretched over the padding 14 and secured to the opposite side of the backing in any suitable manner. Thus the upholstered part is provided with a neat and finished covering, which conceals all the parts of the fasteners when the upholstered part is secured to the frame.

The upholstered part may be secured to the frame of the door by placing it against the studs and pressing the sockets or eyelets 8 into engagement therewith, thus drawing the edges of the upholstered part against the frame to provide a smoothly fitting edge which fits tightly against the surface of the frame part 2 of the door 1, as illustrated in Fig. 3.

If for any reason any of the sockets do not register with the studs when the upholstered part is being secured to the door, the studs may be shifted transversely relative to the frame until they do register with the eyelets 8 which are then pressed into engagement therewith. Thus the upholstered part may be fitted to the door, by shifting the studs until the edges of the upholstered part align with the edges of the door 1.

Figure 6:
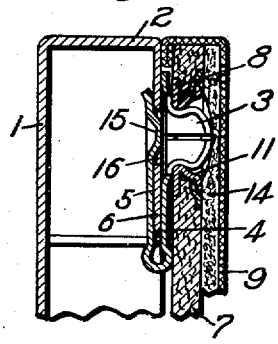
Fig. 6 is a section similar to Fig. 3, showing a modified form of stud secured to the door frame.
Figure 7:
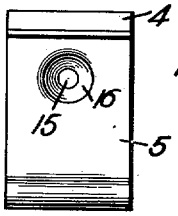
Fig. 7 is a rear elevation of the modified form of removable stud shown in Fig. 6.

Referring now to Figs. 6 and 7, I have shown a modified form of stud for use in upholstery installations.

This stud is substantially as shown and described in connection with the preferred form of my invention, except that it is provided with a detent 15 which is pressed from the spring finger 5 and engages the aperture 2*a* in the front web 6 of the frame part 2 of the door, as illustrated in Fig. 6.

The detent 15 is preferably cone-shaped, so as to provide a cam-shaped surface 16 for disengaging the stud from the aperture 2*a* by moving the stud in any transverse direction relative to the frame part 2. The cross-section of the detent is substantially smaller than the cross-section of the aperture 2*a*, as illustrated in Fig. 3, thereby to permit transverse shifting of the stud for alignment with its cooperating eyelet 8 in the upholstered part.

Figure 8:
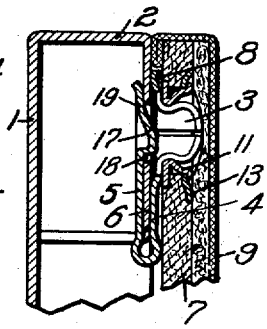
Fig. 8 is a section similar to that shown in Fig. 6, showing a second modified form of removable stud.
Figure 9:
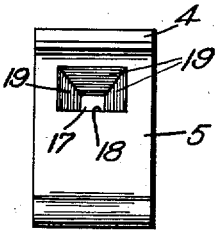
Fig. 9 is a rear elevation of that form of removable stud shown in Fig. 8.

Referring now to the modified form of stud, as illustrated in Figs. 8 and 9, I have shown a stud substantially as shown and described in connection with the modified form of my invention shown in Figs. 6 and 7.

In this instance, however, the detent 17, for engagement with the aperture 2*a* in the frame part 2, is so formed as to present a straight wall 18 at that side thereof toward the inner edge of the frame part 2, thereby to provide a stop to prevent disengagement of the stud from the frame by a pull at that side thereof. The other sides of the detent 17 are provided with cam surfaces 19 to permit separation of the stud from the frame by moving the stud lengthwise of the frame until the detent is free from the aperture 2*a*. Then the stud may be removed from the frame.

While I have shown and described preferred and modified forms of embodiments of my invention, it will be understood that changes involving omission, substitution, alteration and reversal of parts, and even changes in the mode of operation, may be made without departing from the scope of my invention, which is best defined in the following claims.

Claims:

1. A one-piece snap fastener member formed entirely from sheet metal and having a U-shaped portion comprising a base, a hollow boss pressed from said base adjacent to the free end thereof to provide a stud head and neck for cooperative engagement with a snap fastener socket, a portion normally paralleling said base portion and yieldably connected thereto to cooperate therewith for attaching the snap fastener member to a support and a projection pressed from said last mentioned portion and extending toward the base to provide a detent for engagement in a hole in a support to which the snap fastener member may be secured thereby to prevent the snap fastener member from being accidentally displaced from a pretermined position relative to the support.

2. A one-piece snap fastener member formed entirely from sheet metal and having a U-shaped portion comprising a base, a hollow boss pressed from said base adjacent to the free end thereof to provide a stud head and neck for cooperative engagement with a snap fastener socket, a portion normally paralleling said base portion and yieldably connected thereto to cooperate therewith for attaching the snap fastener member to a support and a projection pressed from said last mentioned portion and extending toward the base to provide a detent for engagement with a hole in a support to which the snap fastener member may be secured thereby to prevent the snap fastener member from being accidentally displaced from a predetermined position relative to the support, and said projection having a sloping surface facing toward the open end of said U-shaped portion to act as a wedge to spread the sides of the U-shaped portion apart when forced over the edge of the support.

3. A snap fastener member formed entirely from a single piece of metal bent to provide a U-shaped attaching portion with the side portions of the U normally substantially parallel and adapted to yield away from each other, a stud means formed integral with and extending outwardly from one of the side portions of the U-shaped attaching portion for cooperative engagement with a socket means, and a detent element extending from one of the side portions of the U-shaped attaching portion toward the other side portion and normally intersecting substantially the entire space between the side portions of the attaching portion whereby it will automatically snap into a hole in a support when the support is forced between the side portions of the attaching portion thereby to prevent accidental displacement of the fastener member from the support.

4 A snap fastener member formed entirely from a single piece of sheet metal bent to provide a U-shaped attaching portion with the side portions of the U normally substantially parallel and adapted to yield away from each other, a stud means found integral with and extending outwardly from one of the side portions of the U-shaped attaching portion for cooperative engagement with a socket means, and a hollow boss pressed from the material of the other side portion and extending toward and beneath the first mentioned side portion and normally intersecting substantially the entire space between the side portions of the attaching portion whereby it will automatically snap into a hole in a support to which the snap fastener member may be secured when the support is forced between said side portions thereby to prevent accidental displacement of the fastener member from the support.

ROLLO F. WALTERS.